(12) United States Patent
Jung et al.

(10) Patent No.: US 12,493,730 B2
(45) Date of Patent: Dec. 9, 2025

(54) TIMING-AWARE AND SIMULTANEOUS OPTIMIZATION OF LATCH CLUSTERING AND PLACEMENT IN AN INTEGRATED CIRCUIT

(71) Applicant: INTERNATIONAL BUSINESS MACHINES CORPORATION, Armonk, NY (US)

(72) Inventors: Jinwook Jung, Somers, NY (US); Gi-Joon Nam, Chappaqua, NY (US); Jennifer Kazda, Englewood, NJ (US); Gustavo Enrique Tellez, Hyde Park, NY (US); Chau-Chin Huang, Tainan (TW); Yao-Wen Chang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 17/805,198

(22) Filed: Jun. 2, 2022

(65) Prior Publication Data
US 2023/0394211 A1  Dec. 7, 2023

(51) Int. Cl.
G06F 30/3315 (2020.01)
G06F 30/327 (2020.01)
G06F 119/06 (2020.01)
G06F 119/12 (2020.01)
G06F 119/18 (2020.01)

(52) U.S. Cl.
CPC ........ G06F 30/3315 (2020.01); G06F 30/327 (2020.01); *G06F 2119/06* (2020.01); *G06F 2119/12* (2020.01); *G06F 2119/18* (2020.01)

(58) Field of Classification Search
USPC ........................................ 716/113
See application file for complete search history.

(56) References Cited

U.S. PATENT DOCUMENTS

| 8,104,014 B2 | 1/2012 | Puri et al. |
| 10,002,225 B2 | 6/2018 | Wrixon et al. |
| 2009/0193376 A1* | 7/2009 | Alpert .................. G06F 30/394 716/119 |

OTHER PUBLICATIONS

C.-C. Huang, G. Tellez, G.-J. Nam and Y.-W. Chang, "Latch Clustering for Timing-Power Co-Optimization," 2020 57th ACM/IEEE Design Automation Conference (DAC), San Francisco, CA, USA, 2020, pp. 1-6, doi: 10.1109/DAC18072.2020.9218617 (Year: 2020).*

Lin et al., Post-Placement Power Optimization with Multi-Bit Flip-Flops. IEEE Transactions on Computer-Aided Design of Integrated Circuits and Systems, 30(12), 1870-1882. 2011 (14 pages).

Mangiras et al., Timing-Driven Placement Optimization Facilitated by Timing-Compatibility Flip-Flop Clustering. IEEE Transactions on Computer-Aided Design of Integrated Circuits and Systems, 39(10), 2835-2848. 2019 (14 pages).

(Continued)

*Primary Examiner* — Bryce M Aisaka
(74) *Attorney, Agent, or Firm* — James L. Olsen

(57) ABSTRACT

Embodiments are provided for providing enhanced fabrication and design of an integrated circuit in a computing system by a processor. One or more latches may be clustered by augmenting an integer linear program ("ILP") operation with a facility-location allocation (FLA) operation, wherein the clustering of the one or more latches is timing-aware. The one or more latches may be placed and assigned in the integrated chip based on clustering one or more latches.

15 Claims, 11 Drawing Sheets

(56) References Cited

OTHER PUBLICATIONS

Yang et al., "Design and Algorithm for Clock Gating and Flip-flop Co-optimization". In 2018 IEEE/ACM International Conference on Computer-Aided Design (ICCAD) (pp. 1-6). IEEE. Nov. 2018 (6 pages).
Cherif et al., "A New Multi-Bit Flip-Flop Merging Mechanism for Power Consumption Reduction in the Physical Implementation Stage of ICs Conception". Journal of Low Power Electronics and Applications, 9(1), 3. (9 pages) 2019.
Hsu et al., "Latch Clustering for Minimizing Detection-to-Boosting Latency Toward Low-Power Resilient Circuits". In 2016 ACM/IEEE International Workshop on System Level Interconnect Prediction (SLIP) (pp. 1-6). IEEE. Jun. 2016 (6 pages).
Chang et al., "Graceful register clustering by effective mean shift algorithm for power and timing balancing," in Proc. of the International Symposium on Physical Design (ISPD), 2019, pp. 11-18. DOI: 10.1145/3299902.3309753, (46 pages).
Feng et al., "A parameterized timing-aware flip-flop merging algorithm for clock power reduction," in Proc. Date, 2018, pp. 881-884. doi: 10.23919/DATE.2018.8342131 (4 pages).
Seitanidis et al., "Timing driven incremental multi-bit register composition using a placement-aware ILP formulation," In Proc. DAC, Jun. 2017, pp. 56-61. doi: 10.1145/3061639.3062327. (6 pages).
Kahng et al., "Improved flop tray-based design implementation for power reduction," in Proc. ICCAD, Nov. 2016, pp. 20-29. doi: 10.1145/2966986.2967047 (8 pages).
Wu et al., "Flip-flop clustering by weighted κ-means algorithm," in 2016 53nd ACM/EDAC/IEEE Design Automation Conference (DAC), 2016, pp. 1-6, doi: 10.1145/2897937.2898025. (6 pages).
Xu et al., "Analytical clustering score with application to post placement register clustering," ACM Transactions on Design Automation of Electronic Systems, vol. 21, No. 3, p. 41, 2016. https://doi.org/10.1145/2894753 (18 pages).
Jiang et al., "Integra: Fast multibit flip-flop clustering for clock power saving," IEEE Tcad, vol. 31, No. 2, pp. 192-204, 2012. doi: 10.1109/TCAD.2011.2177459. (13 pages).
Papa et al., "Physical synthesis with clock-network optimization for large systems on chips," IEEE Micro, vol. 31, No. 4, pp. 51-62, 2011. doi: 10.1109/MM.2011.41. (12 pages).
Ward et al., "Clock power minimization using structured latch templates and decision tree induction," in Proc. ICCAD, 2013, pp. 599-606. doi: 10.1109/ICCAD.2013.6691178. (8 pages).
"Cadence Cerebrus AI Studio", Cadence. SoC Encounter, Jul. 24, 2025, 10 pages, http://www.cadence.com.
"What is Open Cores?", Open Cores, Jul. 24, 2025, 02 pages, https://opencores.org/.
Chinnery et al., "Closing the power gap between asic and custom: an asic perspective", In Proceedings of ACM/IEEE Design Automation Conference, Jun. 2005, 07 pages.
Design Compiler User Guide, Version X—Sep. 2005, 2005, 416 pages.
Drexl et al., Facility location models for distribution system design. European Journal of Operational Research, 162(1), 2005, 29 pages.
Held et al., "Post-Routing Latch Optimization for Timing Closure", 2016, 6 pages.

* cited by examiner

TIMING-AWARE AND SIMULTANEOUS OPTIMIZATION OF LATCH CLUSTERING AND PLACEMENT IN AN INTEGRATED CIRCUIT

BACKGROUND

The present invention relates in general to computing systems, and more particularly, to various embodiments for providing timing-aware and simultaneous optimization of latch clustering and placement in an integrated circuit using a computing processor.

SUMMARY

According to an embodiment of the present invention, a method providing enhanced fabrication and design of an integrated circuit in a computing environment, by one or more processors, in a computing system. One or more latches may be clustered by augmenting an integer linear program ("ILP") operation with a facility-location allocation (FLA) operation, wherein the clustering of the one or more latches is timing-aware. The one or more latches may be placed and assigned in the integrated chip based on clustering one or more latches.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

Figure 1:
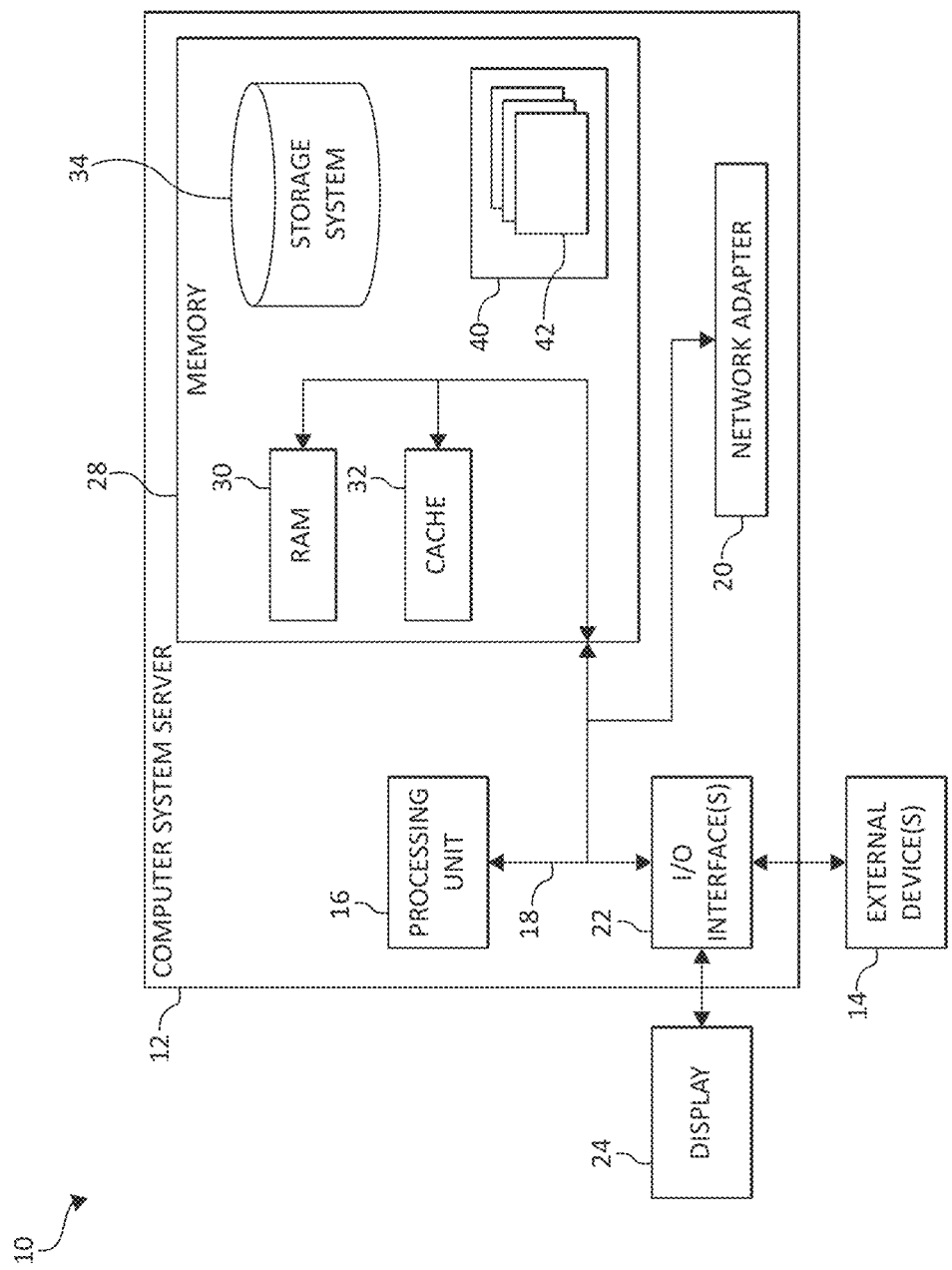
FIG. 1 is a block diagram depicting an exemplary cloud computing node according to an embodiment of the present invention.

The present invention relates generally to the field of electrical, electronic, and computer arts, and more specifically, to semiconductor Electronic Design Automation (EDA) and the like. More specifically, present invention relates fabrication and design of semiconductor chips and integrated circuits and designing the physical layout (e.g., placement) of latches and other logic cells which receive clock signals from clock distribution structures such as local clock buffers ("LCB").

An integrated circuit (IC) is an electronic circuit formed using a semiconductor material, such as Silicon, as a substrate and by adding impurities to form solid-state electronic devices, such as transistors, diodes, capacitors, and resistors. Commonly known as a "chip" or a "package", an integrated circuit is generally encased in hard plastic, forming a "package". Moreover, the IC chip may include a large number of electronic components that are fabricated by layering several different materials on a silicon base or wafer. The design of an IC transforms a circuit description into a geometric description which is known as a layout. A layout typically consists of a set of planar geometric shapes in several layers. A generated layout has to be checked to ensure that it meets all of the design requirements. The result of this check is a set of design files in a particular unambiguous representation known as an intermediate form that describes the layout. The design files are then converted into pattern generator files that are used to produce patterns called "masks" by an optical or electron beam pattern generator.

The process of converting the functional specifications of an electronic circuit into the layout is called the physical design. The objective of the physical design is to determine an optimal arrangement of devices in a plane or in a three-dimensional space, and an efficient interconnection or routing scheme between the devices to obtain the desired functionality. The physical design of a microelectronic IC commonly is an automated optimization process using digital computers and specialized Computer Aided Design (CAD) tools. Automation of the physical design process has increased the level of integration, reduced turn-around time and enhanced chip performance.

For the physical design of ICs, prefabricated elements are used that provide combinatorial or storage functions. These elements are called cells (or types). More specifically, a cell may be a group of one or more circuit elements such as transistors, capacitors, resistors, inductors, and other circuit elements grouped to perform a logic function. Cell types include, for example, core cells, scan cells and input/output (I/O) cells. Each of the cells of an IC may have one or more pins, each of which in turn may be connected to one or more other pins of the IC by wires. A collection of different cells forms a library. The usage of a cell in a design is referred to as instance or circuit. If most of cells have the same height and connect their power through abutted placement in circuit row, the cells are called standard cells and the design style standard cell layout. A particular design element of an IC is a so-called "pin" which refers to a physical or logical access terminal to a cell and circuit. An example for a pin is an inverter having one input and one output pin.

The mentioned instances of an IC are interconnected or routed in accordance with the logical design of the circuit to provide the desired functionality. Hereby the various elements of the circuit are interconnected by electrically conductive lines or traces that are routed through vertical channels and horizontal channels that run between the cells.

In addition, IC chips typically have several metal layers upon which the wires are routed with the horizontal wires routed on different layers than the vertical wires. An electrical connection between two nets on adjacent layers is implemented using a so-called "via" which is an etched hole in a substrate's oxide for allowing a conductive path to extend from one layer to another layer of the underlying IC chip, that can be used e.g., for conducting power (so-called "power via") or even signals. The routing program must therefore produce a list of horizontal and vertical segments for each net, connected by the mentioned vias, all of which have to be conformal with the underlying technology requirements, also known as 'ground rules', for wire spacing and wire capacity.

For example, multi-layer circuits can be built such that power supply terminals ("VDD") and a ground terminal ("GND") can be accessed. For example, metal layer M0 is the first metal layer which holds the source/drain contacts and gate contact of field effect transistor (FET), for example, but may also contain interconnections in horizontal direction. M0 conductors that connect to source, drain or gate are often noted as M0 pin of standard cells. M1 is referred to as a second metal layer and is reserved for output pin or a power staple and also for routing. M2 is referred to as the third metal layer that is reserved for routing. Each of the connections between various layers are made by vertical electrical connectors that pass through the wafer called vias ("V") where, for example V0 links M0 to M1, and V1 links M1 to M2. Power staples are the functional equivalent of via contacts of nodes that connect two horizontal power rails. In another implementation, a "staple" may be defined as a conductive attachment mechanism that pierces or extends through a patch substrate and/or an illumination-system substrate at multiple points. A power staple may also be short pieces of metal connecting two or more adjacent (i.e., consecutive) power rails (e.g., VDD or VSS rails) to mitigate the IR drop. In some implementation, the power staple may be a short straight line power staple. A power staple may also be a solid conductive fastener.

Moreover, the IC chip is fabricated by first conceiving the logical circuit description, and then converting that logical description into the physical description, or the geometric layout. This process is usually carried out using a "netlist," which is a record of all of the nets, or interconnections, between the cell pins. A layout may include a set of planar geometric shapes in several layers. The layout is then checked to ensure that it meets all of the design requirements, particularly timing requirements. The result is a set of design files known as an intermediate form that describes the layout.

The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design. Cell placement in semiconductor fabrication involves a determination of where particular cells should optimally (or near-optimally) be located on the surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA) including Verilog, VHDL and TDML. A typical EDA system receives one or more high level behavioral descriptions of an IC device, and translates this high level design language description into netlists of various levels of abstraction.

Cell placement in semiconductor fabrication involves a determination of where particular cells should optimally (or near-optimally) be located on the surface of an integrated circuit device. While various techniques provide adequate placement of cells with regard to their data interconnections, design consideration must also be given to constructing a clock network for the cells, which require a large amount of power.

There are several techniques for minimizing power while still achieving timing objectives for high performance, low power systems. One method involves the use of local clock buffers (LCBs) to distribute the clock signals. A typical clock control system has a clock generation circuit (e.g., a phase-lock loop) that generates a master clock signal which is fed to a clock distribution network that renders synchronized global clock signals at the LCBs.

Each LCB adjusts the global clock duty cycle and edges to meet the requirements of respective circuit elements, e.g., local logic circuits or latches (the term "latch" as used herein stands for any clocked element which is usually a sink of a clock distribution network). Since this clock network is one of the largest power consumers among all of the interconnects, it is further beneficial to control the capacitive load of the LCBs, each of which is driving a set of many clock sinks. One approach for reducing the capacitive load is latch clustering, i.e., clusters of latches placed near the respective LCB of their clock domain. Latch clustering combined with LCBs can significantly reduce the total clock wire capacitance which in turn reduces overall clock power consumption. Generally, a plurality of latches is controlled by each LCB and can be selectively turned on and off in response to signal sent to the LCB from a clock gating latch.

Challenges arise that effect routing particularly where an ideal clock is assumed during early latch placement and after CTS, the LCBs drive latches in the later stage where large perturbation in placement and timing occur compared to initial placement and where the LCB location is critical for timing closure. Accordingly, the present invention provides a novel solution by providing timing-aware and simultaneous optimization of latch clustering and placement in an integrated circuit. That is, the present invention that optimizes latch clusters and placement for timing and power (e.g., timing and power optimization and efficiency).

In some implementations, one or more latches may be clustered by augmenting an integer linear program ("ILP") operation with a facility-location allocation (FLA) operation, wherein the clustering of the one or more latches is timing-aware. The one or more latches may be placed and assigned in the integrated chip based on clustering one or more latches.

It should be noted that in general, as used herein, "wireability" may be defined as a metric to determine whether a given cell placement can be completely connected both automatically and/or manually given a specified number of wiring planes and fixed blockage. "Congestion" may be defined as the ratio of the occupied area of a design to the total area of the design. A "power rail" may be defined as a long, narrow power rectangle placed horizontally or vertically on a conductive metal wiring level. A three-dimensional "power grid" may be defined by stacking metal levels of alternating horizontal and vertical power rails periodically placed as to permit signal routing in between adjacent rails on the same level. For example, power rails on adjacent conductive levels may be interconnected through vias in insulating layers separating the conductive levels. Conductive metal levels may use notation M1, M2, M3, etc. to indicate the level in an integrated circuit at which the conductive level resides.

Also, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
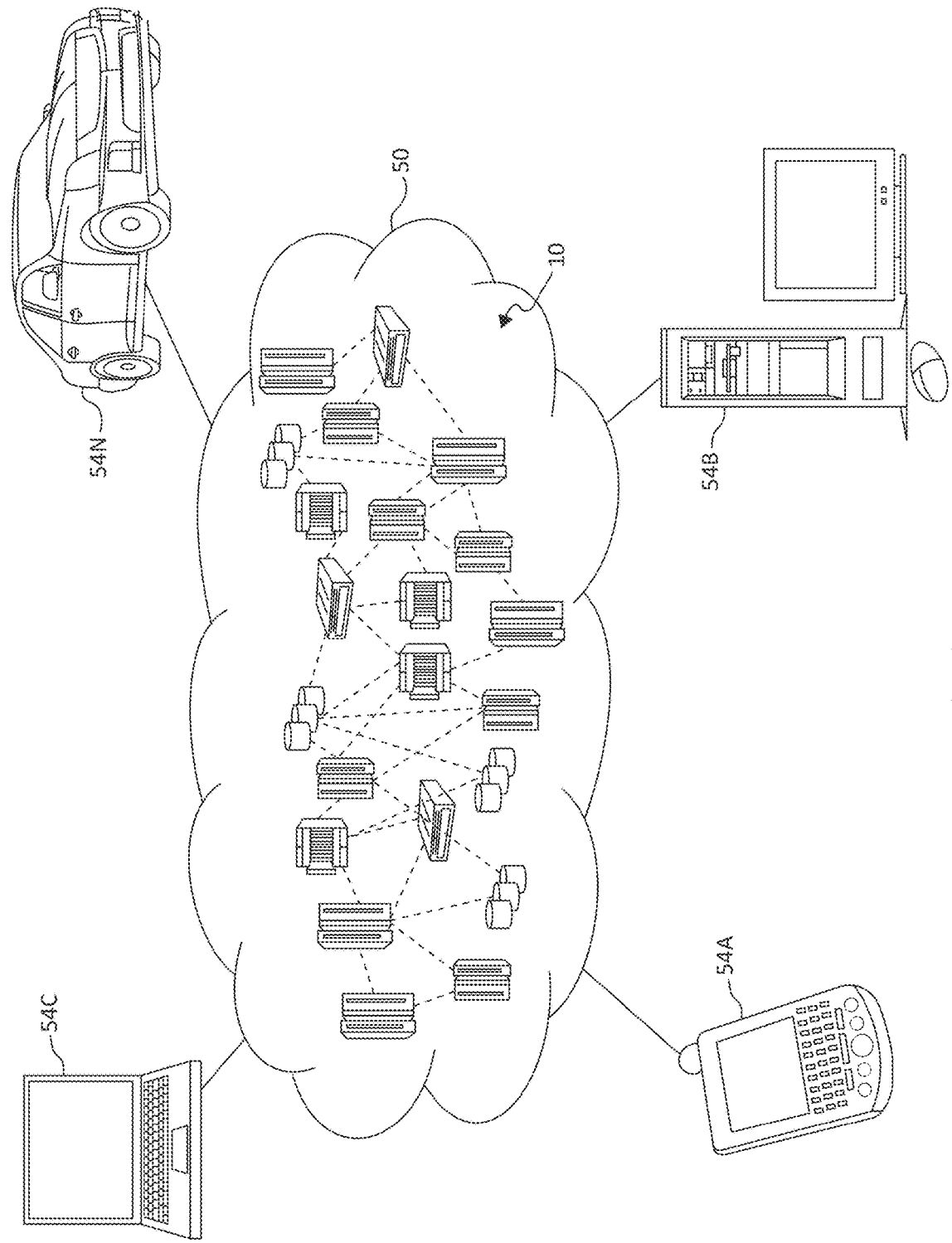
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
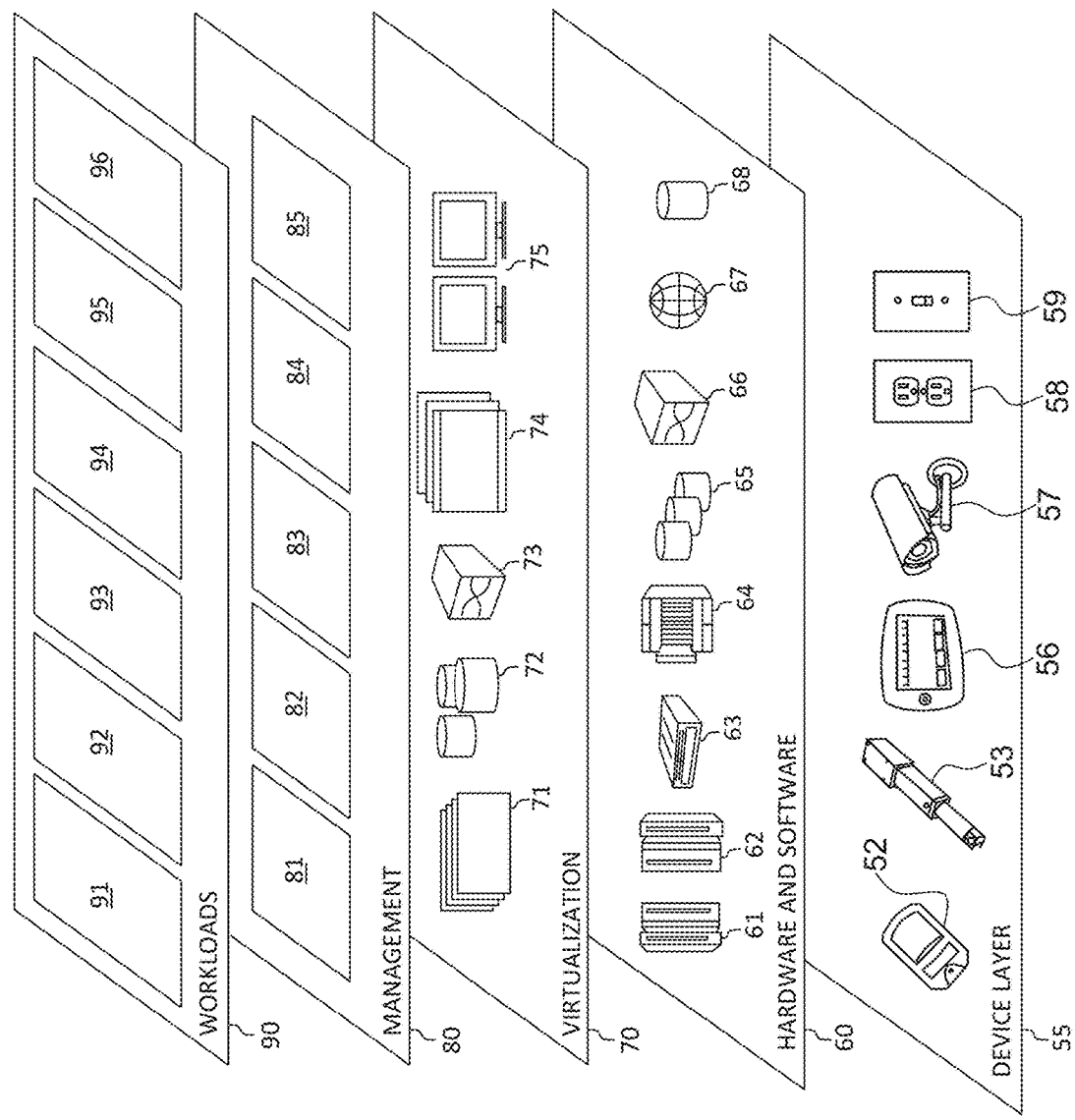
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 providing timing-aware and simultaneous optimization of latch clustering and placement in an integrated circuit in a computing environment (e.g., in a neural network architecture). In addition, workloads and functions 96 for providing timing-aware and simultaneous optimization of latch clustering and placement in an integrated circuit in a computing environment may include such operations as analytics, deep learning, and as will be further described, user and device management functions. One of ordinary skill in the art will appreciate that the workloads and functions 96 for providing timing-aware and simultaneous optimization of latch clustering and placement in an integrated circuit may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
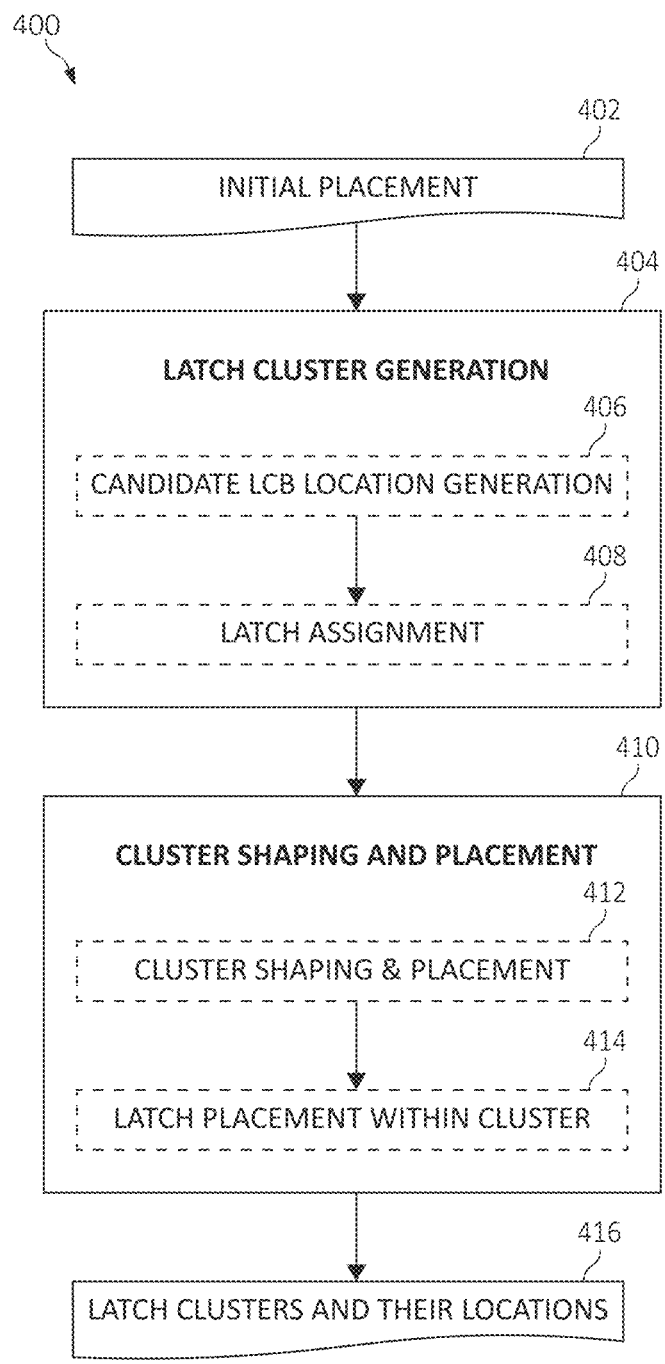
FIG. 4 is a flow diagram depicting an exemplary operations for timing-aware and simultaneous optimization of latch clustering and placement in an integrated circuit in which aspects of the present invention may be realized.

For further explanation, FIG. 4 is a flow diagram 400 depicting an exemplary operations for timing-aware and simultaneous optimization of latch clustering and placement in an integrated circuit. In one aspect, one or more of the components, modules, services, applications, and/or functions described in FIGS. 1-3 may be used in FIG. 4. The functionality 400 may also be implemented as a method executed as instructions on a machine, where the instructions are included on at least one computer readable medium or one non-transitory machine-readable storage medium.

The functionality 400 may start in block 402, with an initial placement. In block 404, one or more latch clusters may be generated (e.g., latch clustering with Facility Location Allocation ("FLA") formulation). As part of operations of block 404, one or more initial candidate LCB locations may be generated. In block 408, a latch assignment to candidate LCBs may be determined.

In block 410, latch cluster shaping, and placement may be performed. As part of operations of block 410, latch cluster shaping and placement may be executed in block 412 and a detailed latch placement within cluster may be provided. That is, the latch clusters, along with the shapes and locations, may be created, shaped, and determined while minimizing the total latch displacement between initial and clock-opt placements and maximizing worst slack and FOM after clustering. In block 416, the latch clusters and associated clusters may be provided.

Figure 5:
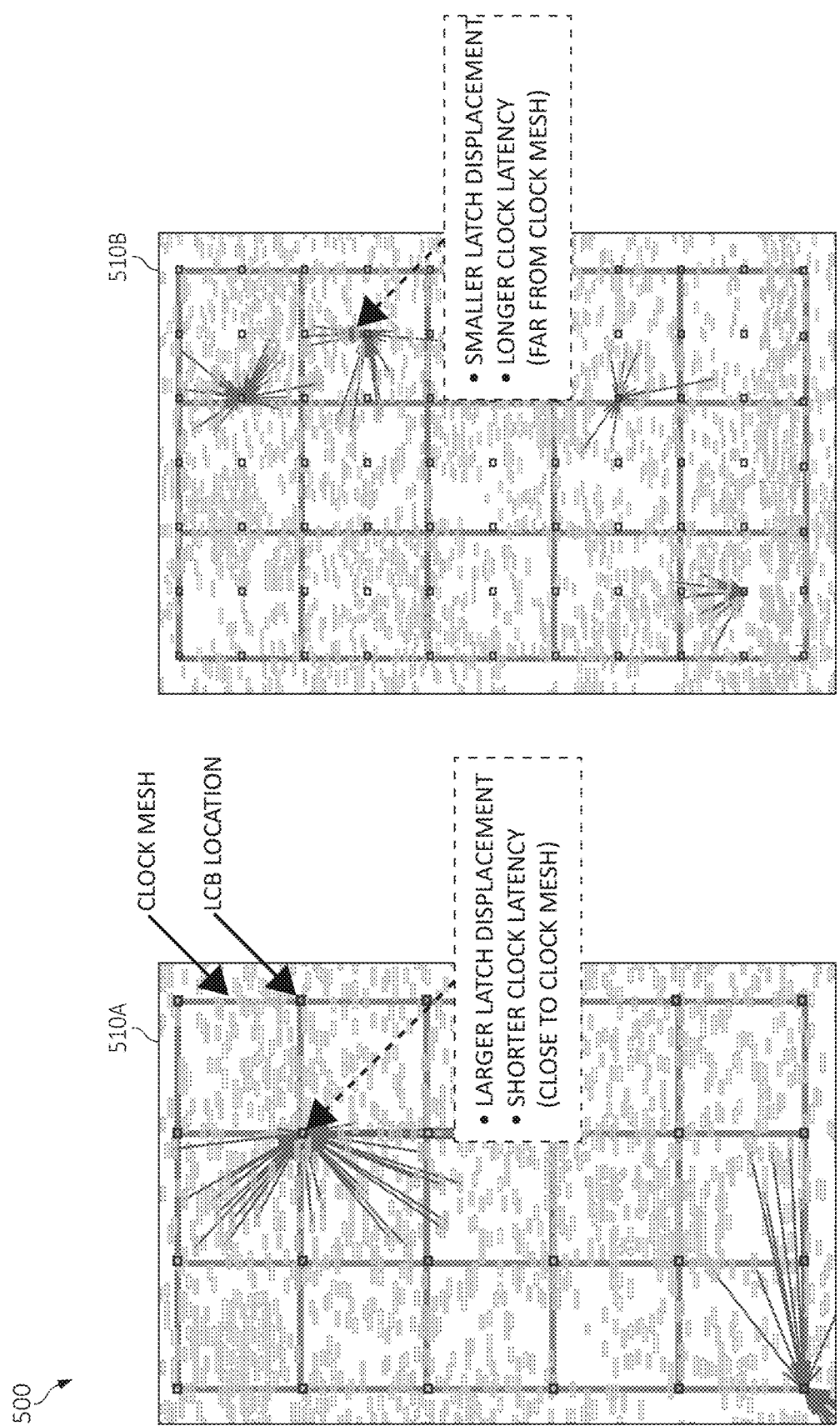
FIG. 5 is a block diagram depicting an exemplary operations for candidate LCB generation in which aspects of the present invention may be realized.

For further FIG. 5 is a block diagram 500 depicting an exemplary operations for candidate LCB generation of an integrated circuit in which aspects of the present invention may be realized. In one aspect, one or more of the components, modules, services, applications, and/or functions described in FIGS. 1-4 may be used in FIG. 5.

In block 510A, a clock mesh and an LCB location are depicted. One or more candidate LCB may be generated. As depicted, block 510A depicts a larger latch displacement and a short clock latency (e.g., close to clock mesh).

As depicted in 510B, one or more smaller latch displacements may be determined such that a smaller latch displacement and longer clock latency (e.g., further away from the clock mesh) occurs. Thus, the challenge of clustering (e.g., a "clustering problem") can be reduced to a Facility Location Allocation (FLA) by determining one or more candidate LCB (i.e., facility) locations based on (1) a distance between LCB/clock mesh, and (2) latch displacement.

Figure 6:
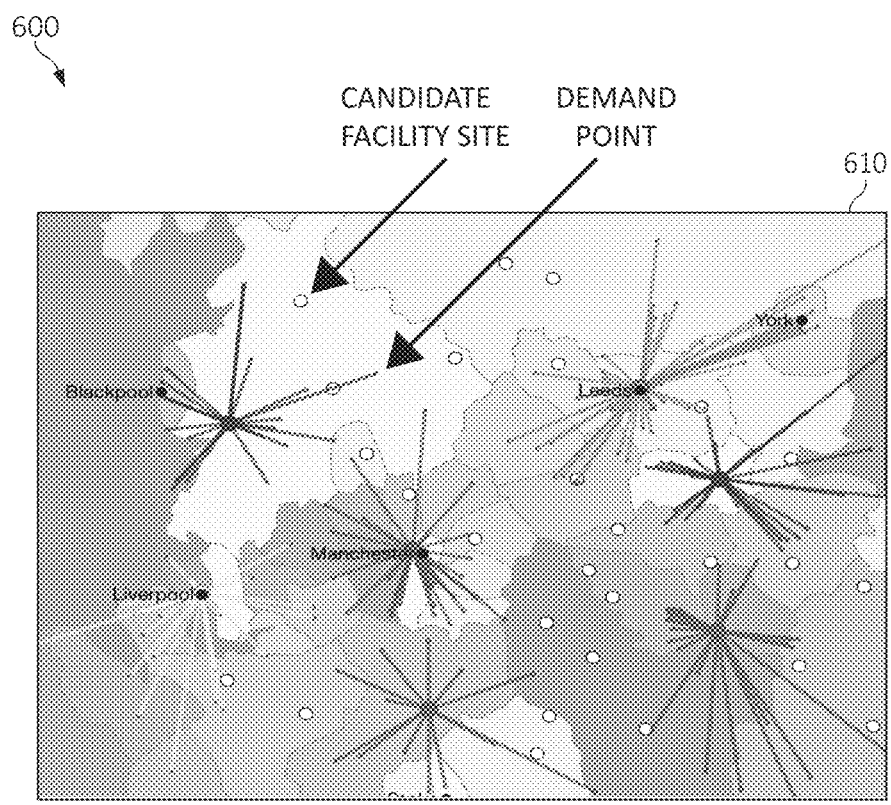
FIG. 6 is a block diagram depicting an exemplary operations for facility location allocation ("FLA") in which aspects of the present invention may be realized.

For further explanation, FIG. 6 is a block diagram 600 depicting an exemplary operations for facility location allocation ("FLA") in which aspects of the present invention may be realized. In one aspect, one or more of the components, modules, services, applications, and/or functions described in FIGS. 1-5 may be used in FIG. 6.

As depicted in FIG. 6, a set of candidate facility sites and a demand point are depicted in a map 610. The FLA may be determined based on a set of demand points D and set of candidate facility sites F. In one aspect, the present invention may determine those of the candidate facility sites that are open (e.g., available for use), and may assign every demand point to the candidate facility sites F, such that a cost to open a facility is minimized using an Integer Linear Programming ("ILP") operation as indicated in the equations below:

$$\text{Minimize } \Sigma_{f_j \in F} p_j x_j, \quad (1)$$

$$\text{Subject to } \Sigma_{d_i \in F} a_{i,j} = c_j u_j, \; \forall f_j \in F$$

$$\text{Subject to } \Sigma_{d_i \in F} a_{i,j} = 1, \; \forall d_i \in F$$

where $p_i x_i$ are the total cost to open/run a facility, $c_j u_j$ is the capacity constraint, and the value of 1 of the $a_i$, j=1 is the assignment constraint, the integer constraints are $a_i$, j=0 or 1 of $(\forall) \in D \times F$ and $x_j$=0 or 1 of $\forall f_j \in F$, where D is the set of demand points, F is a set of candidate facility locations, $d_i$ is the ith demand point, $f_j$ is the jth demand point, $a_i$, j is 1 if the latch $l_j$ is assigned to $b_j$; otherwise 0, $x_i$ is 1 if $f_j$ is used; otherwise 0, and $p_j$ is the price to open $f_j$, and $c_j$ is the capacity to open $f_j$.

Figure 7:
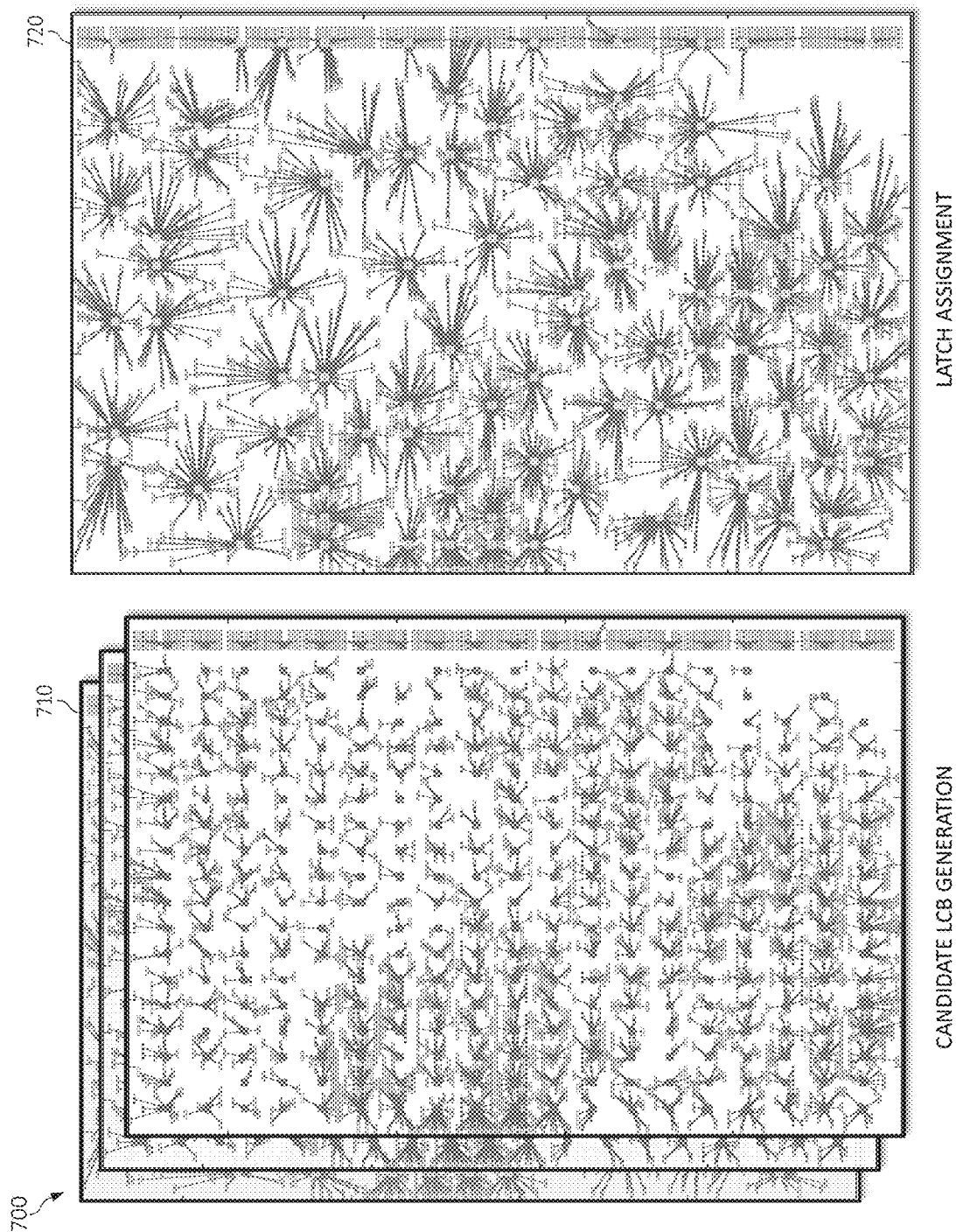
FIG. 7 is a block diagram depicting an exemplary operations for candidate LCB generation and latch assignment in which aspects of the present invention may be realized.

For further explanation, FIG. 7 is a block diagram 700 depicting an exemplary operations for candidate LCB generation and latch assignment in which aspects of the present invention may be realized. In one aspect, one or more of the components, modules, services, applications, and/or functions described in FIGS. 1-6 may be used in FIG. 7.

As depicted, a LCB grid (e.g., a finer LCB grid) is illustrated. For candidate LCB generation, the present invention may first identify one or more candidate LCB location such that the following goals/objects are achieved: 1) minimize a total latch displacement, 2) maximize timing (e.g., worst slack and FOM), and 2) minimize congestion and LCB counts.

In some implementations, for candidate LCB generation, the present invention may perform the following operations. In step 1) create candidate LCBs in a coarse grid and step 2) repeat an n number of times (where n is a positive integer). In step 3) solve the FLA problem with LP relaxation. In step 4) determine if the objectives (see above) are improved. If yes, in step 5), an optimized/best LCB set is identified and used. If no, step 6) create more candidate LCBs in a finer grid 720. In step 7) provide and return the optimized/best LCB set.

Turning now to the finder grid 730, the present invention may cluster the latch assignment. That is, the objective and goal is to assign one or more latches to the candidate LCB's such that the following goals/objects are also achieved: 1) minimize a total latch displacement, 2) maximize timing (e.g., worst slack and FOM), and 2) minimize congestion and LCB counts.

In some implementations, for latch assignment (e.g., assigning latches to the optimized LCBs), the present invention may perform the following operations. In step 1) solve the FLA problem with LP relaxation (see FIG. 6). In step 2) prune out (e.g., remove) LCBs having fewer member latches. In step 3) solve the FLA problem without LP relaxation. In In step 4) assign latches based on an FLA solution.

Figure 8:
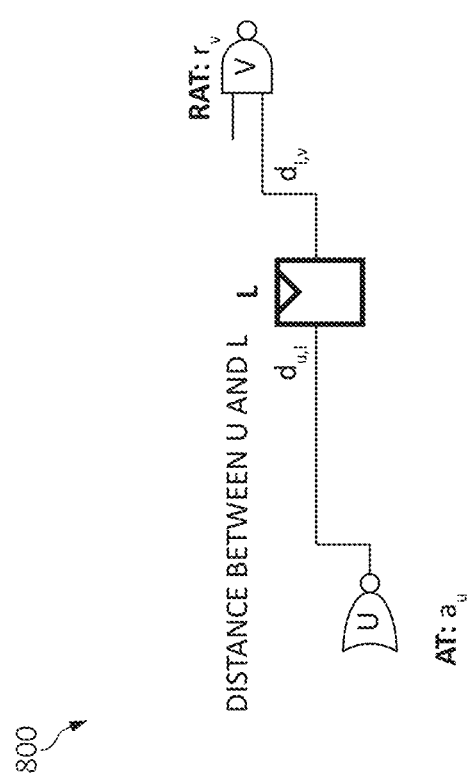
FIG. 8 is a block diagram depicting an exemplary operations for using a timing model for facility location allocation ("FLA") in which aspects of the present invention may be realized.

For further explanation, FIG. 8 is a block diagram 800 depicting an exemplary operations for using a timing model for facility location allocation ("FLA") in which aspects of the present invention may be realized. In one aspect, one or more of the components, modules, services, applications, and/or functions described in FIGS. 1-7 may be used in FIG. 8.

As depicted, a sample latch ("L") is depicted having an input ("$d_{u,l}$") and an output ("$d_{l,v}$") and illustrated the distance between u and l.

In some implementations, the present invention directly embeds a static timing model in an Integer Linear Programming ("ILP") operation. In one aspect, the arrival time (AT) and required arrival time ("RAT") of timing points may be identified or determined. The wire delay may be linearly proportional to wire length (HPWL) where: 1) a timing delay may be equal to a multiplied by the HPWL (e.g., $\alpha$*HPWL) where a is a proportional constant, and 2) let $d_{u,v}$ may be HPWL between u, v and assume $\alpha=1$ for simplicity.

In some implementations, the slack of latch input is:

$$S_{u,l} = T - d_{u,L} - a_u \quad (2),$$

the slack of latch output is:

$$S_{l,v} = r_u - d_{l,v} - a_u \quad (3),$$

and the slack of latch is:

$$S_{l,v} = r_u - d_{l,v} - a_v \quad (4).$$

In some implementations, the IP formulation for clustering becomes $$\text{Minimize } \alpha \Sigma_{l_i \in L} \Sigma_{b_j \in L} d_{i,j} a_{i,j} + \beta \Sigma_{l_i \in L} S_i + \gamma \Sigma_{b_j \in B} c_j u_j \quad (5),$$

$$\text{Subject to } u_j = \Sigma_{l_i \in L} a_{i,j} \forall b_j \in B \quad (6),$$

$$u_j = \Sigma_{l_i \in L} a_{i,j} \forall b_j \in B \quad (6),$$

$$\Sigma_{b_j \in B} a_{i,j} = 1, \; \forall d_i \in D \quad (7),$$

$$\Sigma_{l_i \in L} a_{i,j} \leq N_i * u_j \; \forall b_j \in F \quad (8),$$

$$\Sigma_{b_j \in B} u_j \leq N_b \quad (9).$$

where $\alpha \Sigma_{l_i \in L} \Sigma_{b_j \in L} d_{i,j} a_{i,j}$ is displacement, $\beta \Sigma_{l_i \in L} S_i$ is timing, $\gamma \Sigma_{b_j \in B} c_j u_j$ is congestion, L is a set of latches, B is a set of potential LCB locations, $l_i$ is the ith latch, $b_j$ is the jth potential LCB location, $a_{i,j}$=1 is $l_i$ is assigned to $b_j$; otherwise 0, $u_j$ is 1 if $b_j$ is used; otherwise 0, and $s_i$ is expected timing slack of $l_i$, $d_{i,j}$ is a distance (e.g., Manhattan distance) between i and j, $N_i$ is a maximum fanout for an LCB, and $N_b$ is the maximum LCBs allowed.

Figure 9:
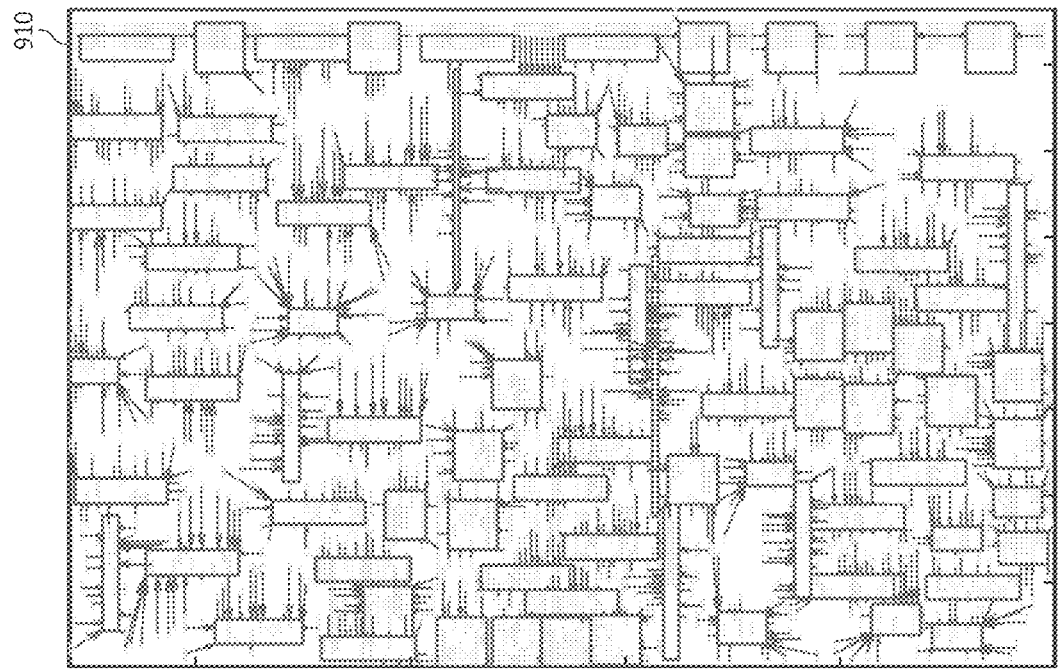
FIG. 9 is a block diagram depicting an exemplary operations for latch cluster shaping and placement in which aspects of the present invention may be realized.
Figure 9:
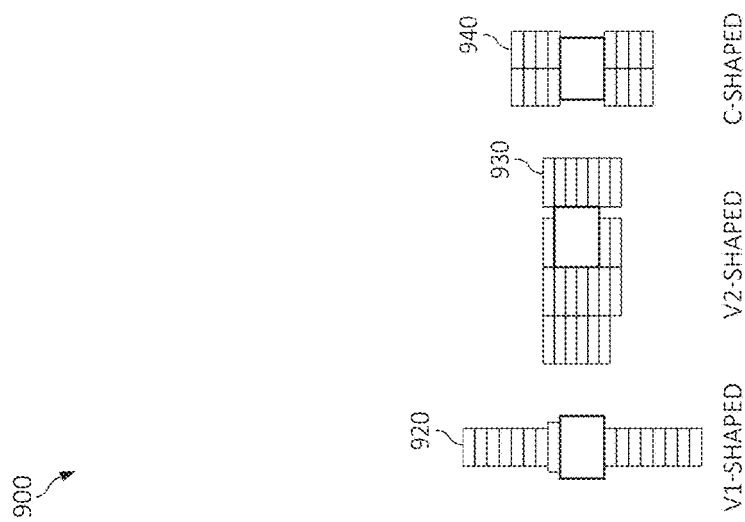

For further explanation, FIG. 9 is a block diagram 900 depicting an exemplary operations for latch cluster shaping and placement in which aspects of the present invention may be realized. In one aspect, one or more of the components, modules, services, applications, and/or functions described in FIGS. 1-8 may be used in FIG. 9.

As depicted in FIG. 9, a grid 910 for latch cluster shaping and placement and one or more latch shapes such as, for example, latch 920 (e.g., a version 1 ("V1") shaped latch), latch 930 (e.g., a version 2 ("V2") shaped latch), and latch 940 (e.g., a C-shaped latch).

In some implementations, the present invention may determine one or more cluster shapes and locations. In some implementations, for cluster shape and location determination, the present invention may formulate the operations as an ILP operation to 1) minimize cluster-center displacement, and 2) maximize timing slack (as an overall goal/objective). The ILP operation may determine one or more cluster shapes and locations based on one or more constraints. In some implementations, the constraints may be: 1) the constraint of clustering the shapes where each cluster is assigned to a specific shape (e.g., assigned to latches 920, 930, and/or 940), 2) the constraint of no overlapping amongst the clusters, and 3) the constraint of placement legality.

Figure 10:
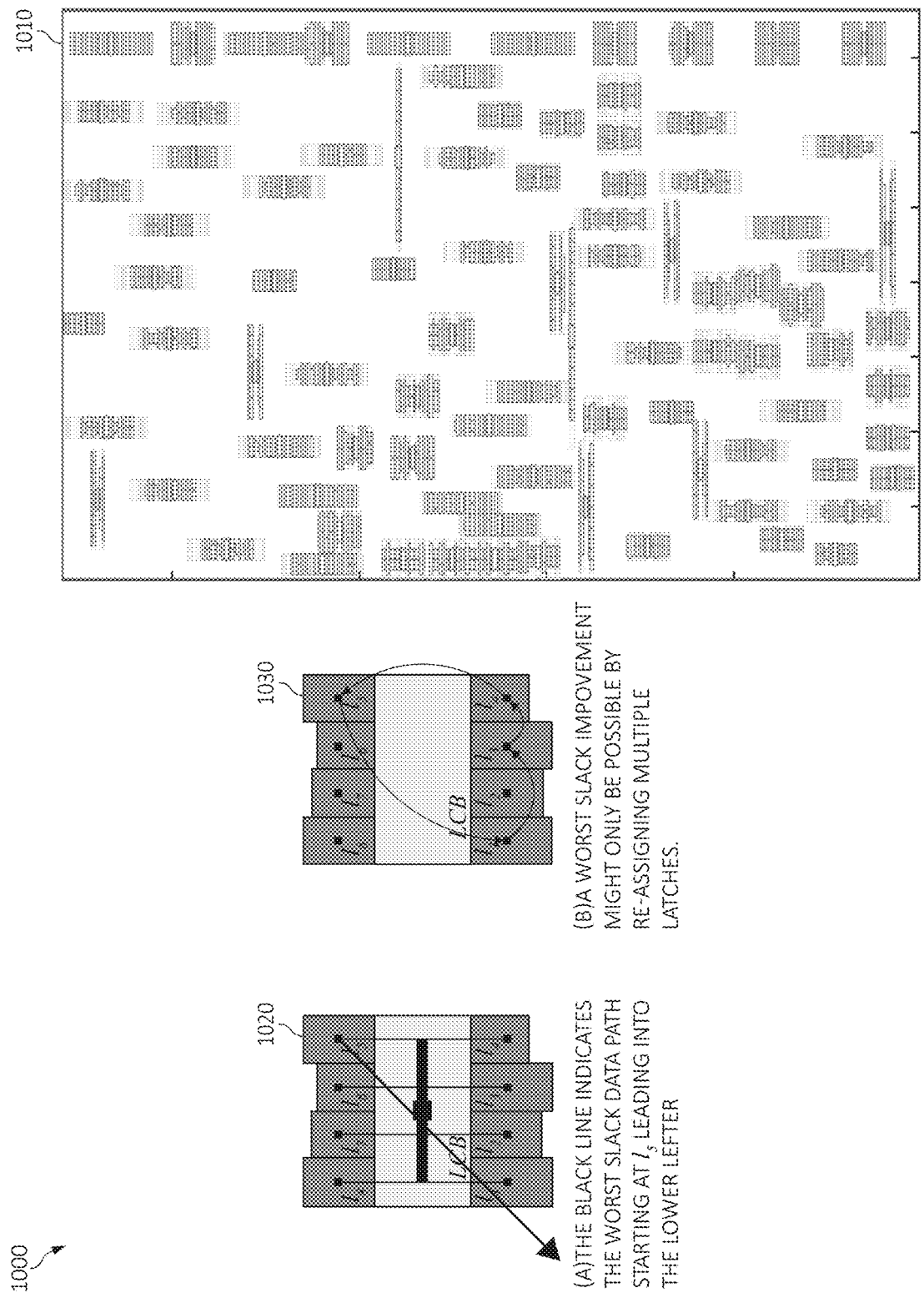
FIG. 10 is a block diagram depicting an exemplary operations for latch placement withing a cluster in which aspects of the present invention may be realized.

For further explanation, FIG. 10 is a block diagram 1000 depicting an exemplary operations for latch placement withing a cluster in which aspects of the present invention may be realized. In one aspect, one or more of the components, modules, services, applications, and/or functions described in FIGS. 1-9 may be used in FIG. 10.

As depicted in FIG. 10, a grid 1010 and slack data paths (a) and (b) are depicted for operations for latch placement withing a cluster. In some implementations, the present invention may determine the latch placement withing a cluster by formulating the operation as an ILP where the objective is to maximize timing slack with the constraint of placement legality.

More specifically, FIG. 10 depicts an example of a latch cluster with an LCB in the center and latches arranged tightly around it in circuit columns $l_1$, $l_2$, $l_3$, $l_4$, and $l_5$, which may be placed on the grid 920.

In some implementations, a clock signal is distributed by the (solid, horizontal line) clock net with a fishbone structure having a wide horizontal backbone for minimum latency and skew. The main goal of the structured latch placement is to minimize clock power and skew, while trying to keep the changes to an initial global placement small. Timing-driven placement refinements based on linear delay models are proposed and particularly applied to latch placement. In addition to activity based signal net weights, latches are clustered to reduce the power consumption of clock networks and the whole chip. Power reduction is also the main focus in the clustering and placement of pulsed latches.

Once the clock placement and routing is determined, data paths can be optimized, given the precise knowledge of the clock signals. After detailed data path optimization, the initial criticalities on which the latch placement was based may have changed.

FIG. 10 shows an example of a latch cluster 1020 and 1030 where acritical data path starts at the upper right latch $l_5$ aiming to a sink in the lower left. With this knowledge, the latch should rather be placed at the bottom left corner of the cluster. In addition, the latch $l_5$ would benefit from a higher drive strength, e.g., the strength of latch $l_1$. Said differently, in latch cluster 1020, a diagonal black line indicates the worst slack data path starting at $l_5$ leading into the lower left. In latch cluster 1030, a worst slack improvement might only be possible by re-assigning multiple latches.

Figure 11:
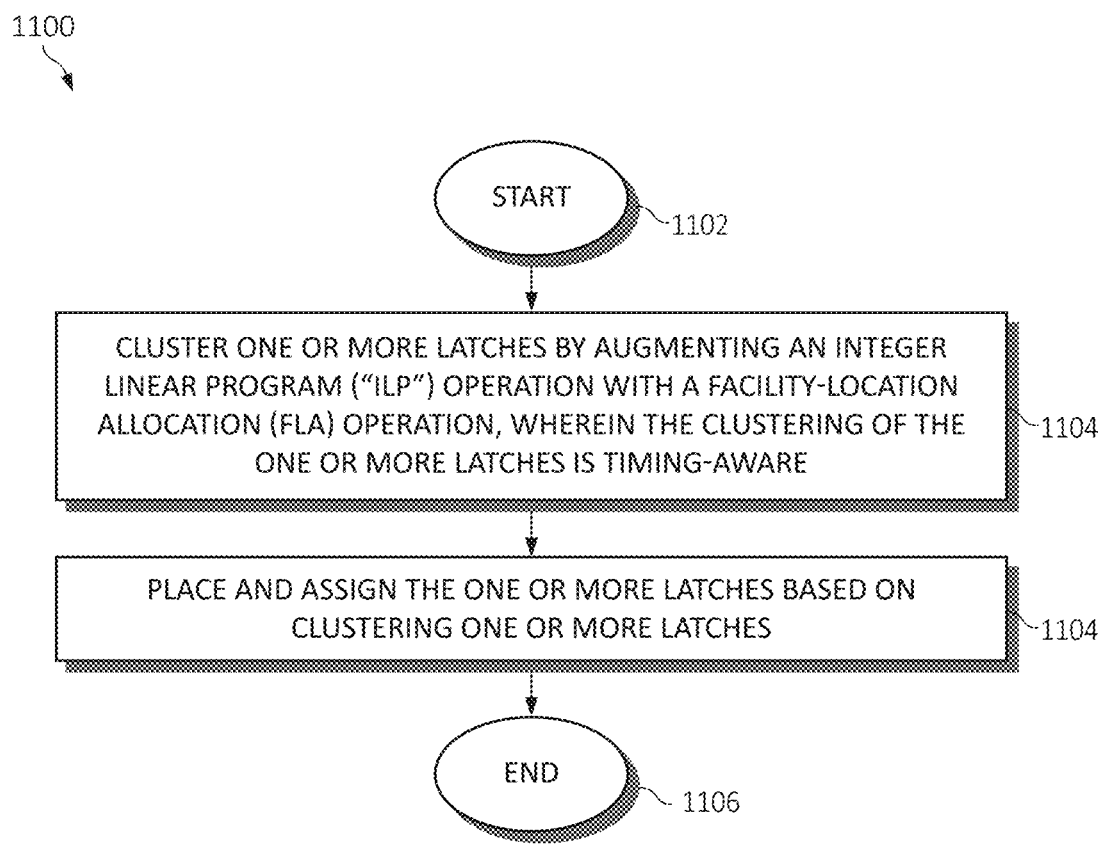
FIG. 11 is a flowchart diagram depicting an exemplary method for providing timing-aware and simultaneous optimization of latch clustering and placement in an integrated circuit by a processor, again in which aspects of the present invention may be realized.

Turning now to FIG. 11, a method 1100 for providing timing-aware and simultaneous optimization of latch clustering and placement in an integrated circuit using a processor is depicted, in which various aspects of the illustrated embodiments may be implemented. The functionality 1100 may be implemented as a method executed as instructions on a machine, where the instructions are included on at least one computer readable medium or one non-transitory machine-readable storage medium. The functionality 1100 may start in block 1102.

One or more latches may be clustered by augmenting an integer linear program ("ILP") operation with a facility-location allocation (FLA) operation where the clustering of the one or more latches is timing-aware, as in block 1104 The one or more latches may be placed and assigned (in/on the integrated chip) based on clustering one or more latches, as in block 1106. The functionality 1100 may end, as in block 1108.

In one aspect, in conjunction with and/or as part of at least one blocks of FIG. 11, the operation of method 1100 may include each of the following. The operations of 1100 may determine a plurality of shapes and locations for the one or more latches. The operations of 1100 may shape each of the one or more latch clusters based on clustering the one or more latches. The operations of 1100 may dynamically maximize timing with static timing analysis (STA) operation, wherein the STA operation is a model embedded into the ILP operation.

The operations of 1100 may generate one or more initial candidate local clock buffer locations for the clustering the one or more latches. The operations of 1100 may assign each of the one or more latches to one or more initial candidate local clock buffer locations for the clustering the one or more latches. The operations of 1100 may determine a number of one or more initial candidate local clock buffers by the FLA operation for power and congestion optimization. The operations of 1100 may use an integer linear program ("ILP") operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing enhanced fabrication and design of an integrated circuit in a computing environment by one or more processors comprising:
    clustering one or more latches by augmenting an integer linear program ("ILP") operation with a facility-location allocation (FLA) operation, wherein the clustering of the one or more latches is timing-aware;
    placing the one or more latches based on clustering the one or more latches; and
    determining a number of one or more initial candidate local clock buffers by the FLA operation for power and congestion optimization.

2. The method of claim 1, further including determining a plurality of shapes and locations for the one or more latches.

3. The method of claim 1, further including shaping each of the one or more latch clusters based on clustering the one or more latches.

4. The method of claim 1, further including dynamically maximize timing with static timing analysis (STA) operation, wherein the STA operation is a model embedded into the ILP operation.

5. A system for providing enhanced fabrication and design of an integrated circuit in a computing environment, comprising:
    one or more computers with executable instructions that when executed cause the system to:
        cluster one or more latches by augmenting an integer linear program ("ILP") operation with a facility-location allocation (FLA) operation, wherein the clustering of the one or more latches is timing-aware;

place the one or more latches based on clustering the one or more latches; and dynamically maximize timing with a static timing analysis (STA) operation, wherein the STA operation is a model embedded into the ILP operation.

6. The system of claim 5, wherein the executable instructions when executed cause the system to determine a plurality of shapes and locations for the one or more latches.

7. The system of claim 5, wherein the executable instructions when executed cause the system to shape each of the one or more latch clusters based on clustering the one or more latches.

8. The system of claim 5, wherein the executable instructions when executed cause the system to generate one or more initial candidate local clock buffer locations for the clustering the one or more latches.

9. The system of claim 5, wherein the executable instructions when executed cause the system to assign each of the one or more latches to one or more initial candidate local clock buffer locations for the clustering the one or more latches.

10. The system of claim 5, wherein the executable instructions when executed cause the system to determine a number of one or more initial candidate local clock buffers by the FLA operation for power and congestion optimization.

11. A computer program product for providing enhanced fabrication and design of an integrated circuit in a computing environment, the computer program product comprising: one or more computer readable storage media, and program instructions collectively stored on the one or more computer readable storage media, the program instruction comprising:

program instructions to cluster one or more latches by augmenting an integer linear program ("ILP") operation with a facility-location allocation (FLA) operation, wherein the clustering of the one or more latches is timing-aware;

program instructions to place the one or more latches based on clustering the one or more latches; and program instructions to dynamically maximize timing with a static timing analysis (STA) operation, wherein the STA operation is a model embedded into the ILP operation.

12. The computer program product of claim 11, further including program instructions to determine a plurality of shapes and locations for the one or more latches; and shape each of the one or more latch clusters based on clustering the one or more latches.

13. The computer program product of claim 11, further including program instructions to generate one or more initial candidate local clock buffer locations for the clustering the one or more latches.

14. The computer program product of claim 11, further including program instructions to assign each of the one or more latches to one or more initial candidate local clock buffer locations for the clustering the one or more latches.

15. The computer program product of claim 11, further including program instructions to determine a number of one or more initial candidate local clock buffers by the FLA operation for power and congestion optimization.

* * * * *